United States Patent [19]

Ausnit

[11] Patent Number: 4,584,706
[45] Date of Patent: Apr. 22, 1986

[54] CHAIN OF LATERALLY INTERCONNECTED BAGS

[75] Inventor: Steven Ausnit, New York, N.Y.

[73] Assignee: Minigrip, Inc., Orangeburg, N.Y.

[21] Appl. No.: 693,095

[22] Filed: Jan. 22, 1985

Related U.S. Application Data

[62] Division of Ser. No. 441,243, Nov. 12, 1982, Pat. No. 4,523,918.

[51] Int. Cl.$^4$ ............................................. B65D 30/00
[52] U.S. Cl. ...................................................... 383/37
[58] Field of Search ......................................... 383/37

[56] References Cited

U.S. PATENT DOCUMENTS

| | | | |
|---|---|---|---|
| 3,358,823 | 12/1967 | Paxton .................................. | 383/37 |
| 3,559,874 | 2/1971 | Titchenal ............................. | 383/37 |
| 3,618,286 | 11/1971 | Membrino ............................ | 383/37 |
| 3,699,746 | 10/1972 | Titchenal et al. .................... | 383/37 |
| 3,791,573 | 2/1974 | Titchenal et al. .................... | 383/37 |

*Primary Examiner*—Stephen P. Garbe
*Attorney, Agent, or Firm*—Hill, Van Santen, Steadman & Simpson

[57] ABSTRACT

An improved method and mechanism for forming a chain of laterally interconnected plastic bags which have confronting releasably interlocking rib and groove profile elements on the inner confronting wall surfaces or at the edge of said surface including advancing a tube or a folded film of plastic bag material having interlocked rib and groove profile elements, forming spaced spot seals at the profile element and alternately at another location to permanently join the layers of material and permanently join the rib and groove elements over the area of the spot, forming lateral seals extending the width of the material at the location of the spot seals to provide side seams for the adjacent bags, and cutting through the material along the center of the seam to partially separate the bags with the cuts extending a predetermined distance partially into the spot seals to control their remaining strength and control the separation force needed to separate adjacent bags.

14 Claims, 19 Drawing Figures

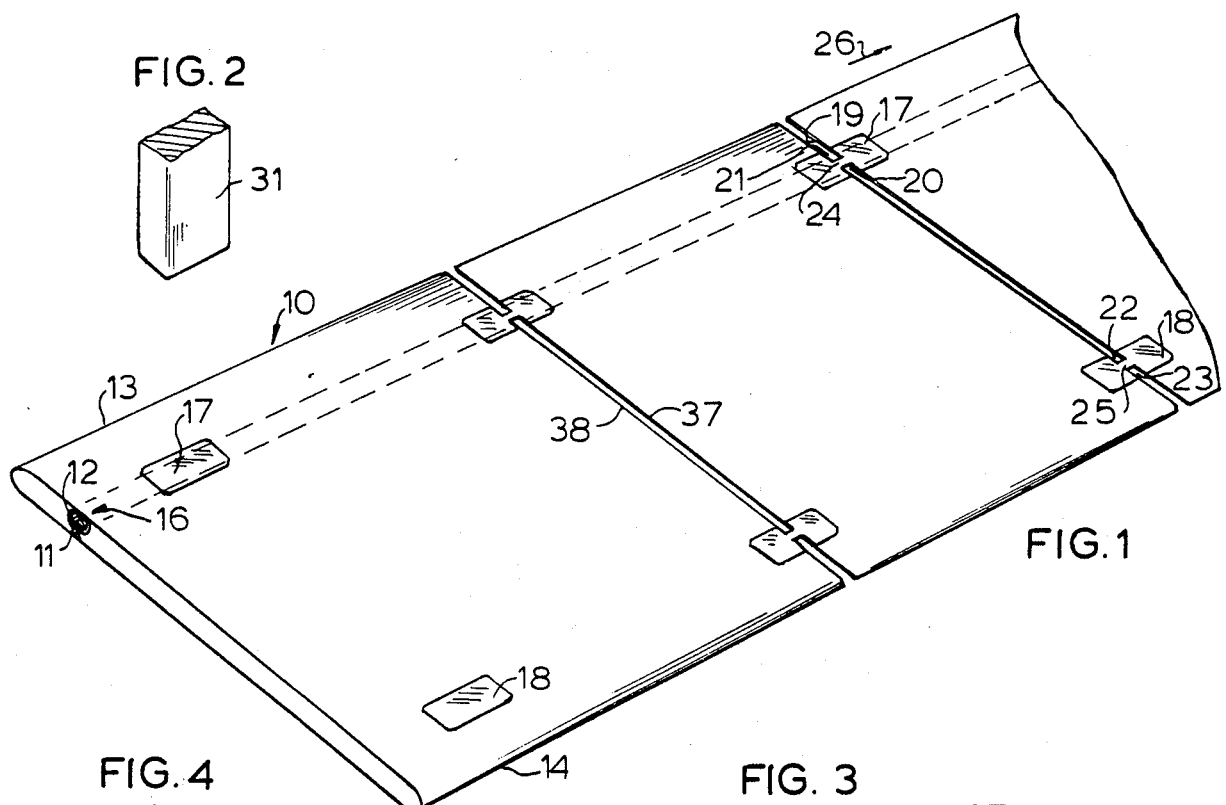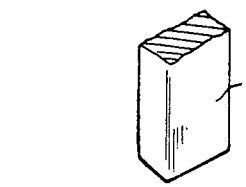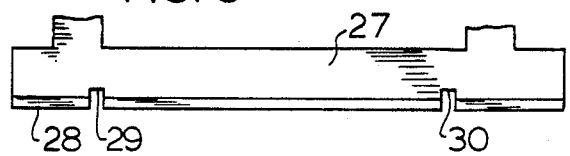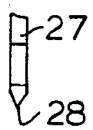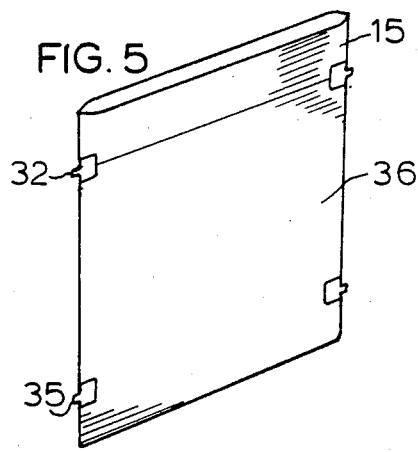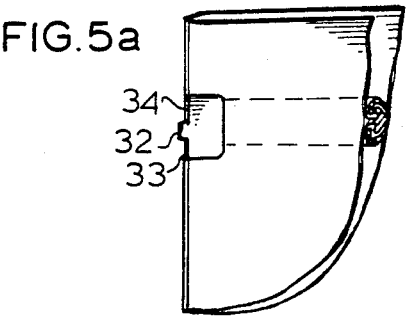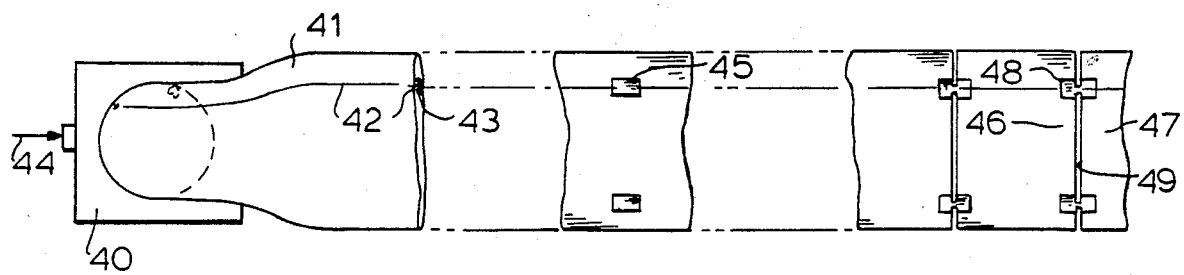

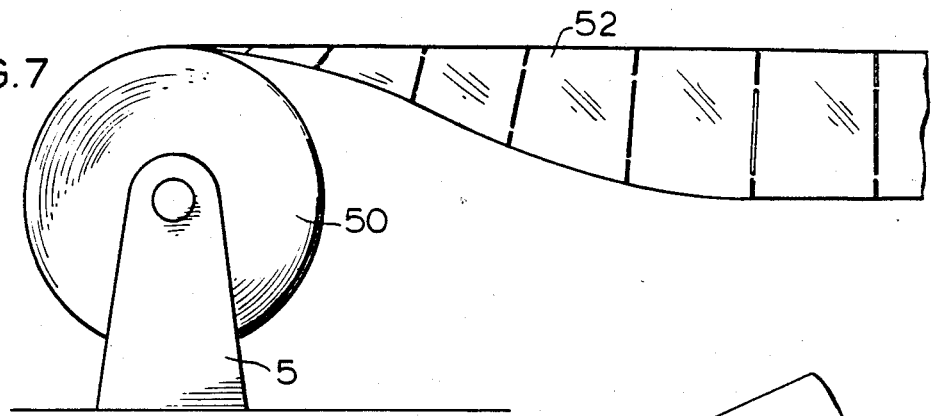
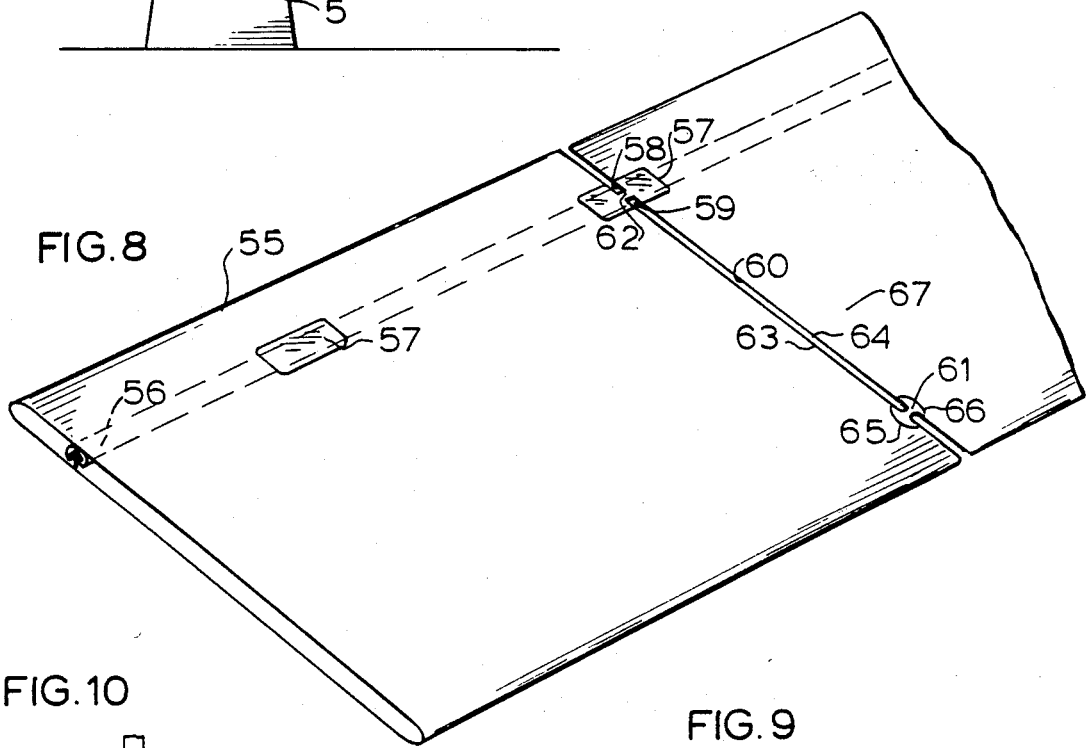
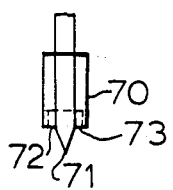
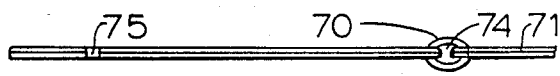
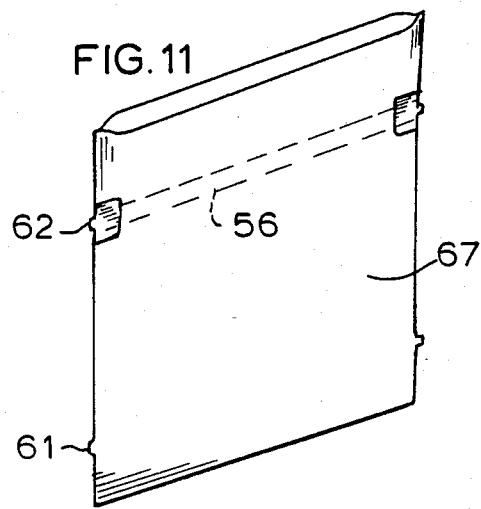

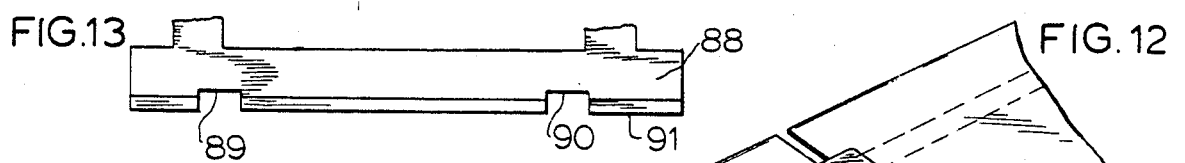
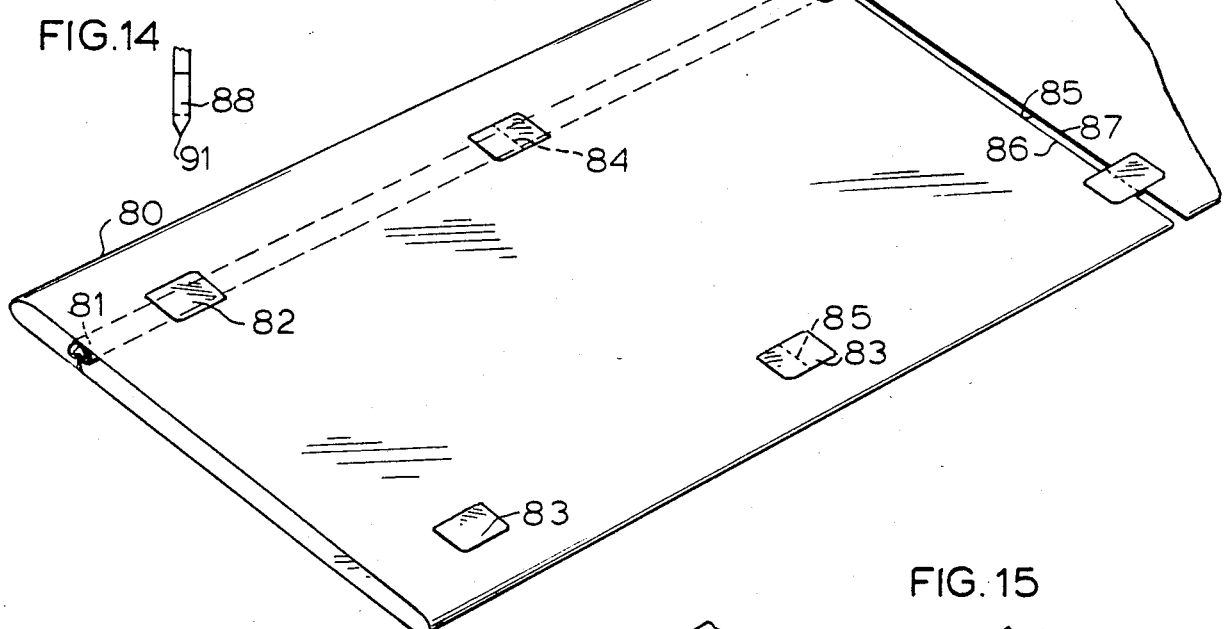
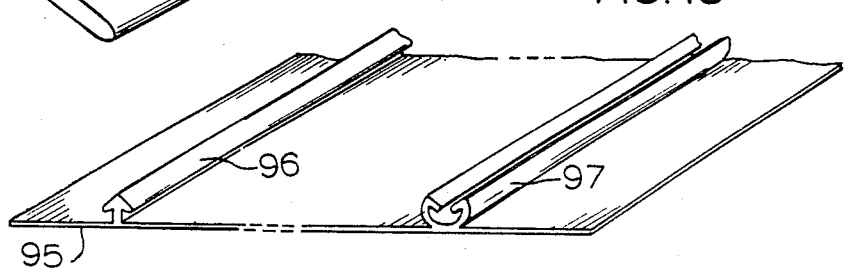
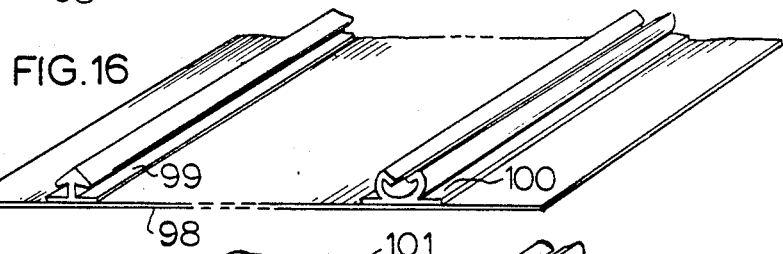
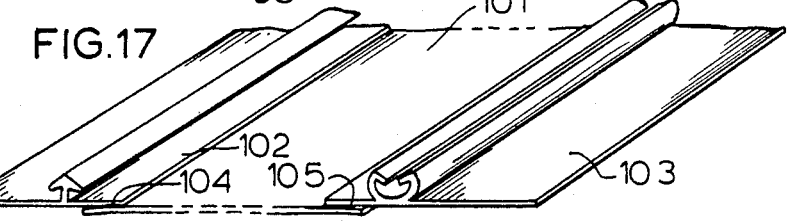
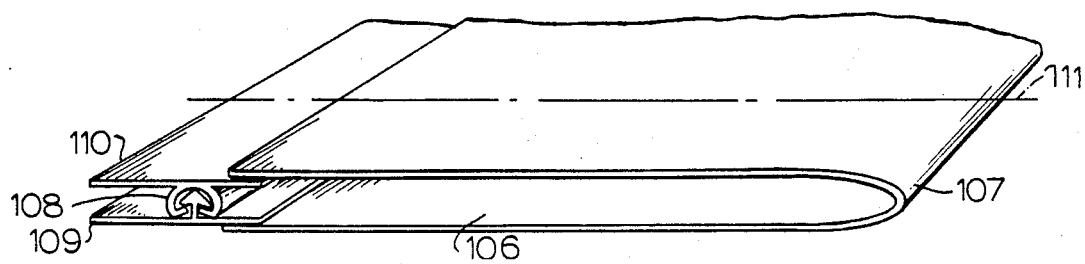

CHAIN OF LATERALLY INTERCONNECTED BAGS

This is a division of application Ser. No. 441,243, filed Nov. 12, 1982, now U.S. Pat. No. 4,523,918, dated June 18, 1985.

BACKGROUND OF THE INVENTION

The present invention relates to improvements in methods and mechanism for making a plastic bag chain, and more particularly for making a chain of bags where adjacent bags are joined by an interconnection which has a predetermined critical breaking strength which can be controlled by the method of manufacture.

The invention relates to thin plastic film bags which have sides and a bottom edge, and at the upper end have a reclosable zipper lock structure. The zipper lock structure constitutes an interlocking rib and groove profile which is closable by applying an opposed closing pressure progressively along the length of the profile elements and which are opened by either drawing the profile apart by pulling flaps or by sliding an opening slider along the length of the profiles or by longitudinal movement of one profile relative to the other. Reclosable bags of this nature are disclosed, for example, in U.S. Pat. Nos. 3,198,228, 3,291,177, 3,338,284 and 3,340,116.

In the manufacture of bags of the above type, they are typically made by the plastic being continuously extruded from a circular die to form an endless tube. However, the bags can be made from a folded flat film with interlocking profiles at either end attached integrally or otherwise. In the tubular form, the mating interlocking profiles are formed on the inner surface of the tube. The profiles are joined when the plastic has cooled sufficiently to eliminate the distortion of the plastic. Subsequently, individual bags are formed by forming cross-seals at spaced intervals to form a seam at the side edges of each bag, and the bag is cut from the tube at the seam.

In one commercially advantageous form, the bags are manufactured from the tube, and are stored to be sold and shipped to the user who opens, fills and recloses the individual bag. These bags may be stacked in boxes, but one preferred arrangement is to cross-seal the bags in such a manner that they can remain in strip form and the individual bags torn off of the supply strip. One arrangement for utilizing such a bag is disclosed in the copending application, Ser. No. 429,617, now U.S. Pat. No. 4,490,959, dated Jan. 1, 1985, wherein automatic machinery has been devised for feeding, opening and reclosing the reclosable bags. Such mechanism utilizes a series of interconnected bags drawing them along a travel path through the work stations of the machine. At one section of the machine, the individual bags are removed from the supply chain by being forcibly torn from the chain.

Whether the interconnected chain of bags is used in automatic machinery such as above referred to, or whether the chain of bags is used manually, a factor of importance is the force which must be applied to tear the individual bags from the supply chain. If the interconnecting means is too strong, it will be difficult to tear individual bags from the supply chain, and such tearing can result in damage to the bag being removed or to the next sequential bag. If the interconnecting means is of insufficient strength, the advantages of keeping the bag supply in a chain are lost in that the chain may accidentally break, and thus becomes wholly unsuitable for automatic machinery, which must draw in the chain of bags and remove individual bags by applying a predetermined pulling force determined by the machinery design.

In this type of interconnected chain of bags, it is not only important to have the interconnecting means have a strength within the right range, but it is also very important to have the strength of attachment of the bags be uniform within certain tolerances so that in a feeding mechanism of a machine, the device can be set to apply a uniform force and uniform results be obtained.

One form of interconnection is to have the bags cut laterally from each other, but remain attached at one or more locations where the plastic is not cut. However, this type of interconnection does not always tear uniformly, and it becomes necessary essentially to fracture the entire interconnection at one time. Further, the fractured interconnection at times provides an unattractive or unsightly torn portion, and with improper tearing, the torn portion can extend into the bag to rupture the bag wall and destroy the air or moisture-tight integrity of the bag material.

It is accordingly an object of the present invention to provide an improved method and mechansim for the manufacture of a continuous bag chain wherein individual plastic bags can be torn from the supply, in such a way that the interconnection between the bags tears readily and easily and uniformly without endangering the integrity of the adjacent bags.

A still further object of the invention is to provide an improved mechanism for forming cross-cuts and cross-seals on a supply of bag tubing or folded film which has interlocked profiles on the inner surface of the tube or inner surface or edge of the film so that the bags are cut and the side seams are formed in the same operation, and so that an interconnecting junction of plastic is formed between adjacent bags with a cut or perforation of predetermined length in that junction so that the interconnecting portion of plastic which remains is of a predetermined strength and size and will rupture with the application of a uniform predetermined tearing force.

A further object of the invention is to provide an improve method and mechanism which is utilized in making a bag chain wherein the strength of attachment of the individual bags can be controlled and wherein the process can be used to provide either one or a plurality of attaching links of material.

A further object of the invention is to provide an improved method and mechanism of making a bag chain wherein the bags are attached in a chain by frangible links and the links are constructed so that they contribute to the function of the interlocking rib and groove element by permanently aligning these elements at their ends.

Other objects, advantages, and features as well as equivalent methods and structures, will become more apparent from the teaching of the principles of the invention in connection with the disclosure of the preferred embodiments in the specification, claims and drawings, in which:

DESCRIPTION OF THE DRAWINGS

FIG. 1 is a perspective view illustrating a section of bag chain manufactured by a method and mechanism embodying the principles of the present invention;

FIGS. 2, 3 and 4 are fragmentary schematic showings of the sealing and cutting mechanisms, employed in forming the bag chain;

FIG. 5 and FIG. 5A are respectively a perspective showing of the bag and an enlarged fragmentary section of the edge of the bag which is torn from the bag chain supply;

FIG. 6 is a schematic step illustration of the method of forming the bag chain;

FIG. 7 is an elevational view of a bag chain supply roll;

FIG. 8 is a perspective view of as bag chain formed with a different link structure;

FIGS. 9 and 10 are respectively side and end elevational views of the cutting and sealing mechanism for forming the bag chain of FIG. 8;

FIG. 11 is a perspective view of a bag removed from the bag chain of FIG. 8;

FIG. 12 is a perspective view of a bag chain formed with a further embodiment of a joining link;

FIGS. 13 and 14 are side and end elevational views respectively of the cutting and sealing mechanism used to form the chain of FIG. 12;

FIG. 15 is a perspective view of a plastic film for making a bag, which may be utilized in the practice of the present invention, wherein the film is a flat sheet with integral profiles;

FIG. 16 is an end sectional view of a film for use in the practice of the invention wherein the profile are attached;

FIG. 17 is a perspective view of a film for a bag for use with the present invention wherein the profiles are formed on separate strips attached to a bag body film; and FIG. 18 is a perspective view illustrating film folded for forming into a bag chain illustrating the use of flat film for the invention.

DESCRIPTION OF THE PREFERRED EMBODIMENTS

As illustrated in FIGS. 1 through 5A, a bag chain is formed by supplying a continuous endless tube of thermoplastic bag material. The tube 10 is formed folded to form a top edge 13 and a bottom edge 14 of the bags. The flattened tube material has a longitudinally extending continuous interlocked closure 16 extending therealong which is provided by a shaped rib element 11 and a shaped groove element 12 on the inner facing walls of the bag. The profiles are interlocked or joined to each other as the bag tubular film is supplied in flat form as illustrated at 10.

As the tube of plastic bag material is advanced, heat is applied at bag width intervals to longitudinally spaced spot seal areas 17. This seal as well as the other seals are preferably provided by the application of a heated tool such as shown at 31 in FIG. 2 which melts the plastic fusing it to form the seal area 17. In some instances, only a seal area such as 17 will be provided near the top of the bag, and in some instances depending upon the machinery which is utilizing the bag, a second heat seal area 18 will be provided laterally spaced from the seal area 17. The spacing of the seal areas 17 from each other and the areas 18 from each other will be determined by the width of the bag which will eventually be formed. The seal area can be formed by the application of the heated sealing tool 31, or an ultrasonic sealing horn.

The seal areas 17 are positioned exactly at the location of the interlocked fastener profiles 16 and will permanently join the rib and groove elements at that location. Since that location will mark the edge of each of the bags, the seal area forms a dual function, one of providing the frangible interconnecting link joining adjacent bags and the other of providing a permanently orienting junction between the rib and groove elements holding them interlocked at the edge of the bag. Thus, when the bag is to be closed, the user can start at the edge applying an interlocking pressure by sliding his thumb and forefinger along the top of the bag, and the rib and groove elements will always interlock because they will start in the proper relationship.

The junction 17 also provides a broad area where the plastic is of extra strength due to the plastic melting together, this being an area of stress on the bag. When the bag is filled with contents, handling will cause stress at the corner points which are at the ends of the rib and groove elements adjacent the opening, and the juncture area 17 reinforces this location.

The bags are next formed by providing a cross-sealing and cutting operation. This is done by providing a cut 19 extending completely across the tube except extending only a limited distance into each of the spot seals 17 and/or 18. Simultaneously, seams 37 and 38 are produced at each side of the cut 19 to join the front and back walls of each bag. The seams 37 and 38 could be formed first with the cut being made subsequently, but advantageously this is completed in a single operation.

The mechanism for forming the cross-cut and seal is in the form of a sealing knife 27, FIG. 3 and FIG. 4. The sealing knife is heated to a temperature to melt and fuse the plastic by suitable means, such as an internal electrical heating element. At its lower edge, the sealing knife has a cutting edge 28 which cuts through and seals the tube to form the bag edges 38 and 37. For this purpose, the tube will rest on a suitable support such as a heat resistant bar or roller which may be positioned at the location where the cut and seam are to be made.

A unique feature of the knife 27 is the cutting gaps 29 and 30. These gaps are recessed into the cutting edge 28 so that at the gaps no cutting will occur. The gaps 29 and 30 are of a predetermined length for the purpose of leaving a connecting breakable link 24 and/or 25 at the spot seals. Thus, the knife will cut into the spot seals a predetermined distance forming cuts 21 and 20 for the spot seals 17, and forming cuts 22 and 23 for the spot seals 18 if such a second spot seal is required. It is contemplated to provide means on the knife to adjust the size of the cutting gap 29 and 30 such as by having inserts with different gap lengths, with the ultimate purpose being to provide a breakable link 24 and 25 of the correct length. The operator will have knowledge of the strength of the plastic and an accurate predetermination of the strength of the breakable link can be made by leaving a link of the correct length. It is also possible to provide a lower link 25 of a shorter length than the upper link 24 so that that link will break more easily or break earlier depending upon the machinery which is to handle the bags or depending upon the use of the bag chain. In many instances only an upper breakable link will be required so that only the upper spot seal 17 is employed and no lower spot seal 18 is used. In certain circumstances such as with very thin bag material, the lower spot seal may be undesirable in that it may weaken the walls of the bag at that area whereas the upper spot seal has additional flowable plastic being located at the rib and groove elements.

When the treatment of the spot seals has been completed to leave the frangible links, individual bags may be torn from the bag chain by applying a force as indicated by the directional arrow 26 in FIG. 1.

The resultant bag is shown at 36 in FIGS. 5 and 5A. Location 32 is where the breakable link has been torn.

FIG. 6 illustrates a bag supply chain made in a complete operation where the plastic tube is made and formed into a bag chain in a continuous process. Molten plastic is first supplied by suitable supply means shown by the arrowed line 44 to a die 40 having an annular gap through which is extruded a continuous plastic tube 41. The plastic tube 41 has continuous confronting matching rib and groove elements 42 on the inner surface. The rib and groove elements 42 and 43 are pressed together and interlocked, when the plastic is sufficiently cool so that the rib and groove elements will not deform.

The plastic tubing moves on and one or more spot seals 45 are provided at each bag section interval along the tubing, with one of the spot seals 45 at each interval being formed at the location of the interlocked profiles 42 and 43.

The tubing next is moved to a station where a cut 49 is made across the width of the tubular material to form separate adjacent bags 46 and 47, but with the cuts 49 extending only a predetermined distance into the spot seal 45 to leave the frangible link 48 interconnecting the bags 46 and 47 to the chain.

The chain of interconnected bags is conveniently rolled onto a roll 50, FIG. 7, supported on a stand 5 with the chain fed on as shown at 52. When the bags are to be used by either being manually torn from the chain, or fed into a machine where they are mechanically individually removed, the chain is pulled off of the roll, and the frangible links have sufficient strength so that the chain can be pulled without the links unintentionally rupturing. The bag chain can also be folded accordion fashion into a box.

The drawings illustrate three arrangements for forming a frangible seal utilizing the concept of uniquely weakening a spot seal to insure its tearing easily and correctly and to control its breaking strength. In the arrangements shown in connection with FIGS. 1, 8, and 12, tubing is used, but it will be understood that the invention may be practiced with flat film which is doubled to bring the profiles together, as will be described in connection with FIGS. 15 through 18.

FIGS. 8 through 11 illustrate another form of providing a frangible link structure for interconnecting bags in a bag chain. In FIG. 8 a continuous tube of flattened plastic is fed forwardly with rib and groove interlocking profile elements 56 joined. At longitudinally spaced locations, spot seals 57 are provided. A cross-cut 60 is formed at the location of the spot seal extending into the spot seal 57 a limited distance as shown by the cuts 58 and 59 leaving a link portion 62. The cuts are arranged so that the link portion 62 is of a predetermined width to afford a predetermined strength to the link. At the time the cut 60 is made, seams 63 and 64 are simultaneously produced at the edges of the bags. A lower link 61 is formed by leaving an uncut portion 61, however, no spot seal is formed at location 61. Instead, the side seams 63 and 64 curve around the uncut link 61 as shown by the portions 65 and 66. Thus, the remaining link 61 is part of the original film. This construction makes it possible to provide a lower link with very lightweight material in that a spot seal is not necessary and the risk of perforating or melting the plastic film to result in a hole in the bag is eliminated.

The bag 67 is torn from the end of the chain and is shown in FIG. 11 with small projections left from the links 61 and 62.

A cutting bar 70 is shown in FIG. 9 which has a knife cutting edge 71, FIG. 10. The bar 70 is heated by a suitable means such as embedded electrical elements. A gap 75 in the knife edge 71 provides the upper link 62, and gap 74 provides the lower link 61.

FIG. 12 illustrates still another manner of forming frangible links to interconnect bags. A continuous tube 80 of plastic is fed forwardly to work stations with rib and groove profile elements 81 interlocked. Longitudinally spaced spot seals 82 are made at the location of the profile elements by the application of heat to melt the plastic and join the rib and groove elements in a permanent fashion at that location. Lower spot seals 83 may also be provided in alignment with the upper spot seals 82, or if a single connecting link is desired, the lower spot seal 83 is omitted. The spot seals then pass to a perforation station where perforations 84 and 85 are formed through the spot seals. These perforations remove a predetermined amount of material to reduce the strength of the spot seals to a predetermined breaking strength.

The spot seals are then moved to a cross-sealing and cutting station where a lateral cut 85 is made across the tube with side seams 86 and 87 being simultaneously produced at each side of the cut to provide seams for the side edges of the bags. The bags then remain joined to the supply chain by the spot seals 82 and 83 and can be individually torn with the perforations insuring that tearing will occur at the center of the spot seal. The cross-seal and cutting is performed by heated knife 88 (FIGS. 13 and 14) which is applied across the material and has a lower knife cutting edge 91 with a gap 89 therein to bridge the spot seal 82 and if required, a gap 90 therein to bridge the spot seal 83.

In FIG. 15 a flat layer of film 95 is illustrated with integral mating male and female profiles 96 and 97 on the surface thereof. This film will be folded by being doubled in the center to bring the profiles together and to interlock them to where the film has the appearance shown in FIG. 18, and the doubled or folded film may be then treated in the same manner by forming the spot seals and cutting and sealing as described in connection with the use of the principles of the invention for tubing.

FIG. 16 illustrates film formed by attaching profiles. A flat sheet of film 98 has separate profile strips 99 and 100 attached thereto by heat sealing or cementing the profile strips to the film. The film is then doubled in its center to bring the profile strips together and interlock the profiles so that the film has the appearance of FIG. 18.

FIG. 17 illustrates a film 101 with profile strips attached to the edges. A profile strip 102 is attached to one edge of the film and another profile strip 103 is attached to the other edge. Strip 102 is attached by heat sealing or cementing to the film along a seal 104, and the strip 103 is attached along a seal 105. This film is then doubled to bring the profiles together in the general manner shown in FIG. 18. FIG. 18 shows the film doubled at 107 to form a continuous doubled strip 106. The profiles are joined to form a profile bead 108 with top flaps 109 and 110 at the sides of the strip 106, and the flaps 109 and 110 will form the opening flaps for the bag. The spot seals, the lateral cross-cutting and cross-seaming is accomplished at longitudinally spaced locations as indicated by the line 111 in the manner shown in the preceding drawing figures and descriptions in connection with a tubular film, as shown and described in connection with FIGS. 1, 8 and 12.

Thus, it will be seen that I have provided an improved method and mechanism for making a bag chain which meets the objectives and advantages above set forth. The structures are shown schematically, and the elements for forming the spot seals and cuts and seams can be located at operational stations with the tubular material or folded material moved forward through the stations, or the operating devices optionally may be moved along a stationary continuous bag tube or folded which are advanced incrementally as needed. The provision of the improved connecting link insures that breakage will occur at a predetermined location without skewing or spreading into the bag material so that the resultant bag chain can reliably be on automatic machinery without requiring continuous inspection and without the possibility of leaking bags resulting from tearing the leading bag off of the chain. The method and mechanism for forming the bag chain is well suited to high speed production machinery, and the principles are capable of being used with profile tubular material or profile flat film material and for manufacture of bags of varying sizes and with materials of varying weights.

I claim as my invention:

1. A chain of laterally interconnected bags comprising in combination:
    a plurality of bags formed of a continuous film each having joined releasably interconnecting rib and groove profiles on their inner surfaces with the profiles of successive bags in alignment;
    a connecting link of plastic between each of the bags forming a spot seal interconnecting the layers of the bags and located between adjacent bags; and
    means defining a cut of predetermined length partially separating the bags and extending into said spot seal a predetermined distance and controlling the strength of the spot seal for separation of the bags with a predetermined force.

2. A chain of laterally interconnected bags constructed in accordance with claim 1:
    wherein said seal is located at the profiles to permanently join the profiles at the area of the seal.

3. A chain of laterally interconnected bags constructed in accordance with claim 1:
    and including a plurality of said spot seals along said cut, with each spot seal having a cut extending a predetermined distance for controlling the strength of the spot seals for separation of the bags with a predetermined force.

4. A chain of laterally interconnected bags constructed in accordance with claim 1:
    wherein said rib and groove profiles are attached to the film at confronting wall edges.

5. A chain of laterally interconnected bags constructed in accordance with claim 1:
    wherein said continuous film is doubled at one edge to form the bottom of the bags and has confronting wall edges at the top of the bags.

6. A plastic bag for containing material comprising in combination:
    front and back bag walls joined along their sides by seams;
    confronting interlocked rib and groove elements on the confronting inner faces of the bag walls extending laterally to the seams;
    a seal area of plastic integrally joining the profiles at their ends having a portion of the edge of the seal at the bag edge formed by a smooth cut and a portion formed by forcibly tearing the seal with both portions extending parallel to the bag seam.

7. A bag according to claim 6, having an additional seal area spaced from said seal area which integrally joins the profiles at their ends, said additional seal area having a portion of the edge thereof at the bag edge formed by a smooth cut and a portion formed by forcibly tearing the seal area with both portions extending parallel to the bag seams.

8. A plastic bag for containing material, comprising in combination;
    front and back bag walls joined along their sides by seams;
    confronting interlocked rib and groove elements on the confronting inner faces of the bag walls extending laterally to the seams; and
    a seal area of plastic integrally joining the profiles at their ends having the edge of the seal area formed by forcibly tearing the seal area along perforations that were cut in the seal area and extending parallel to the bag seams.

9. A bag according to claim 8, including a second seal area of plastic integrally joining the bag walls at the same side of the bag as, and spaced from, said seal area of plastic which integrally joins the profiles at their end, and said second seal area having an edge formed by forcibly tearing the seal area along a line of perforations cut therethrough parallel to the bag seams.

10. A chain of laterally interconnected plastic bags having confronting releasably interlocking rib and groove profile elements on the inner confronting wall surfaces and with seams along side edges of adjacent bags, comprising;
    at least one spot seal connecting each side seam of each bag side edge with the next adjacent bag side edge seam in the chain; and
    means for weakening said spot seals for controlling the force required to separate the bags from one another by breaking the connecting spot seal.

11. A bag according to claim 10, including a second connecting spot seal along each seam, and said second spot seal also having means for weakening the second spot seal for controlling the force required to separate the bags from one another by breaking the connecting spot seals.

12. A chain of laterally interconnected bags comprising, in combination:
    a plurality of bags formed of continuous film and each bag having joined releasably interconnecting rib and groove profiles on the inner surfaces of the bag with the profiles of successive bags in alignment;
    a connecting link of plastic located between each of adjacent ones of the bags and comprising a spot seal interconnecting the layers of the bags;
    means defining a cut of predetermined length partially separating the bags; and
    perforations extending through the spot seals for controlling the strength of the spot seals for separation of the bags with a predetermined force to break the spot seals at said perforations.

13. A chain of laterally connected bags constructed in accordance with claim 12, wherein said seals are located at the aligned profiles for connecting the bags at the profiles.

14. A chain of laterally interconnected bags constructed in accordance with claim 12, and comprising a plurality of said spot seals along said cuts, with each spot seal having said perforation for controlling the strength of the spot seals for separation of the bags with predetermined force to break the spot seals at said perforations.

* * * * *